June 17, 1930.  S. H. BANDLA  1,764,602
ANTISKID BRAKE FOR SELF PROPELLED VEHICLES
Filed May 14, 1929   3 Sheets-Sheet 2
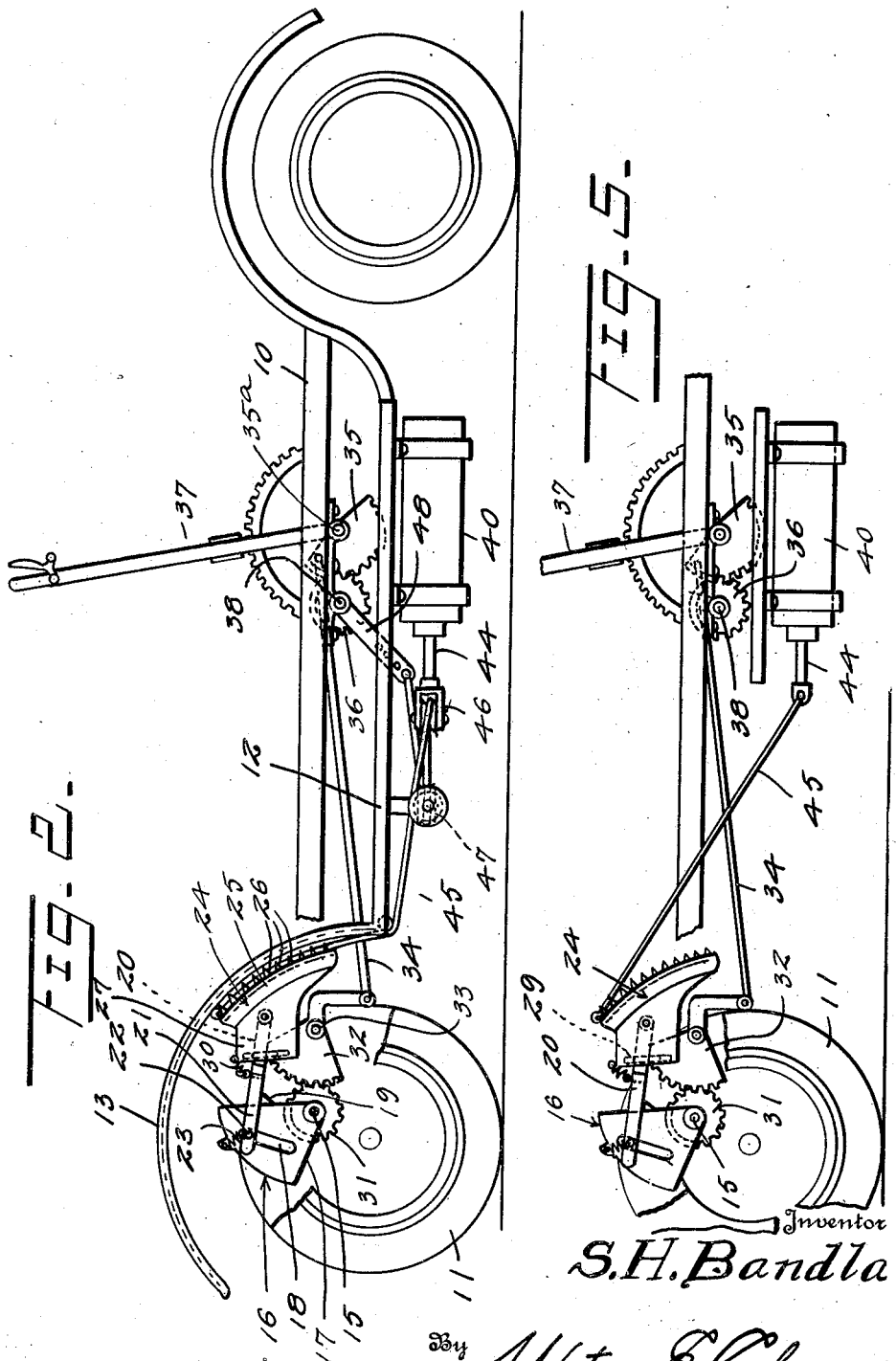
Inventor
S. H. Bandla
By Watson E. Coleman
Attorney

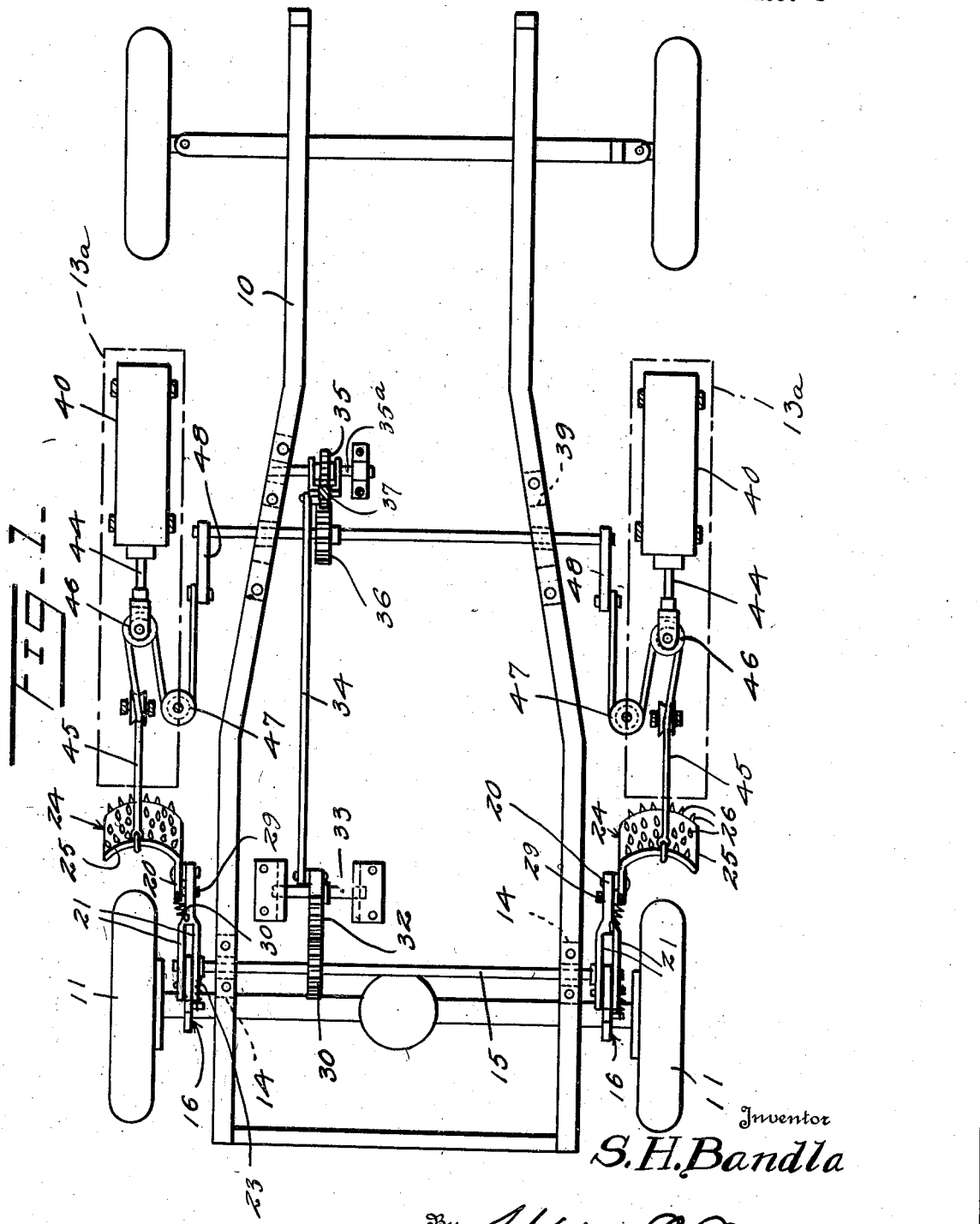

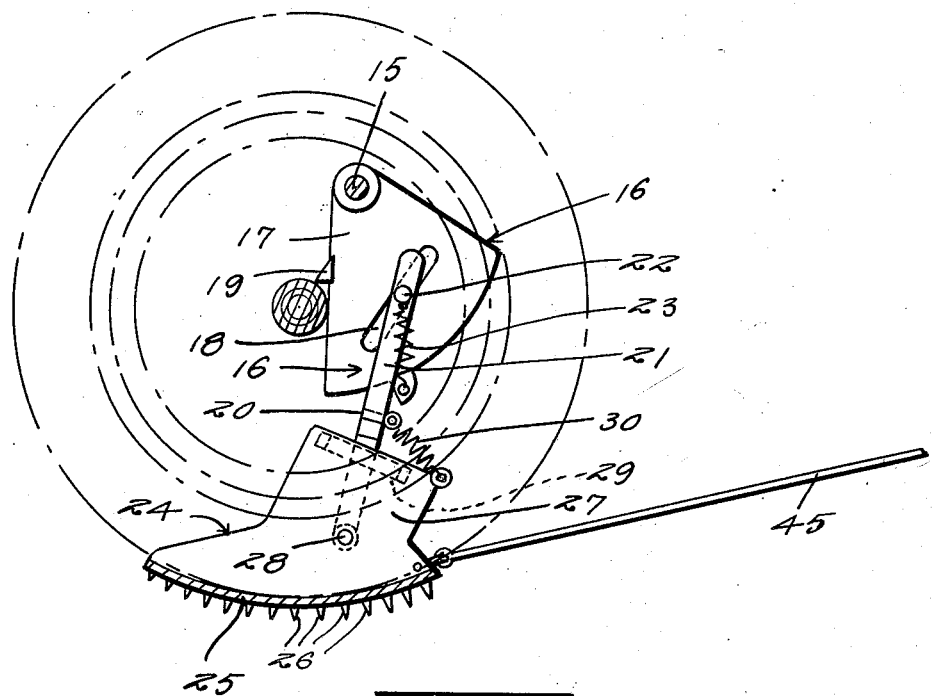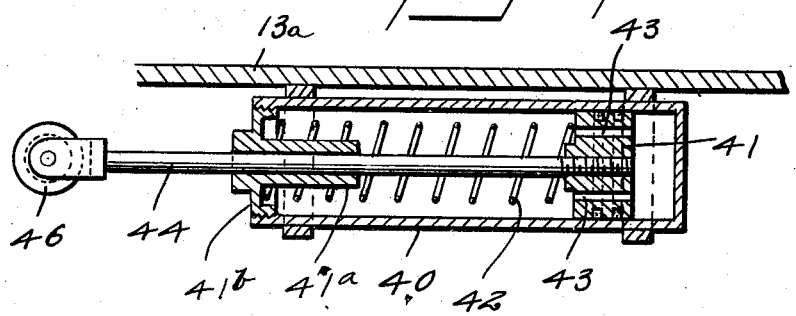

Patented June 17, 1930

1,764,602

UNITED STATES PATENT OFFICE

STEPHEN H. BANDLA, OF BUFFALO, NEW YORK

ANTISKID BRAKE FOR SELF-PROPELLED VEHICLES

Application filed May 14, 1929. Serial No. 362,978.

This invention relates to vehicle brakes and more particularly to a skid preventing brake for use with self-propelled vehicles.

An important object of the invention is to provide a construction such that a vehicle may be operated with or without skid chains or other wheel attached skid preventing devices, and which at the same time will be safe to operate upon slippery streets and in particular for icy streets.

A further and more specific object of the invention is to provide a structure which may be permanently carried by an automobile, and in event of a skid or of necessity for a sudden stop, will be placed beneath the wheel of the vehicle in such position that it will effectually and rapidly check the motion thereof.

A still further object of the invention is the provision of skid shoes carried by a vehicle and provided with spiked surfaces adapted to come into engagement with the ground together with the means for shifting these shoes from an inoperative position where they may be concealed by the fenders of the vehicle, to an operative position where they are interposed between the vehicle wheel and the ground.

Still another object of the invention is to provide in a construction of this character an arrangement preventing too sudden interposition of the shoes between the wheels and the ground.

These and other objects I attain by the construction shown in the accompanying drawings wherein for the purpose of illustration I have shown a preferred embodiment of my invention and wherein:—

Figure 1 is a plan view of the chassis of a motor vehicle with my invention applied thereto;

Figure 2 is a side elevation;

Figure 3 is an enlarged sectional view with parts in elevation;

Figure 4 is a detailed sectional view of one of the dashpots; and

Figure 5 is a side elevation of a modification.

Referring now more particularly to the drawings, the numeral 10 generally designates the frame of a vehicle chassis, 11 the rear supporting wheels thereof, 12 the running boards, and 13 the fenders extended upwardly over the rear wheel.

In accordance with my invention I mount at the rear of the vehicle and preferably above and slightly in advance of the rear axle in bearings 14 carried by the frame 10, a shaft 15, the ends of which are provided with arms which are generally designated as 16. Each arm 16 comprises a shaft attached portion 17 in the form of a relatively broad plate having a substantially radially directed slot 18 and having at one edge thereof at a point in alignment with the approximate center of the slot, a shoulder or lug 19.

The outer section of each arm has its inner end forked, as at 20, to receive therebetween the plate 17, and the arms 21 of the fork are connected by a pin 22 extending through the slot 18. A spring secured to the plate adjacent the end of the slot and connected to the arms 22 as indicated at 23, serves to constantly urge the ends of these arms toward the outer end of the slot.

Carried by the outer end of the outer section of each arm is a shoe, generally designated at 24. This shoe comprises a main body portion 25 which is transversely and longitudinally curved to substantially conform to the transverse and longitudinal curvature of the tire of the wheel 11. The inner face of this main body portion is smooth, while the outer face thereof has projecting therefrom spikes 26, which increase in length from one end of the body portion to the other.

At one side, the body portion has attached thereto a flat extension 27 to which the outer end of the arm section is directly pivoted, as indicated at 28. This flat extension is relatively wide and the pivotal connection lies inwardly of the free end thereof. Adjacent its free end the face of this extension has opposed thereto a yoke 29, which limits the swinging movement about the pivot 28. A spring 30 connecting the upper or inward end of the shoe with the arm at a point intermediate the ends of the arm constantly tends to rotate the shoe to maintain the end thereof having the shorter spikes in advance. This end may be termed the lower or initial engaging end, and when shaft 15 is rotated this end of the shoe first interposes between the wheel and the ground. The pivotal connection of the shoe with the outer arm section, and the connection of the outer and inner arm sections permit the shoe to oscillate so that it may adapt itself to and properly fit against the surface of the tire and permit the effective limit of the arm to vary so that the arm may be of effective length, enabling the shoe to be interposed between the wheel and the ground and at the same time, when moved to its inoperative position, short enough to bring the shoe fairly close to the surface of the wheel, and thus permits its disposition between the wheel and the fender. This is obtained by reason of the fact that when the inner arm section is swung downwardly the pin may move inwardly in the slot 18 or outwardly therein as is necessary to enable the arm to have the desired length.

When, however, the arm is rotated upwardly, the weight of the shoe afforded by spring 23, will cause this spring to travel at the outer end of the slot so that the arm sections are no longer in alinement, but are disposed inwardly at right angles to one another. At this time, the outer arm section rests upon the lug 19. Means are provided for rotating shaft 15, consisting of a pinion or segment gear 31 secured to shaft 15, a segment gear 32 mounted upon a pivot 33 and meshing with the gear 31, a link 34 connecting the segment gear 32 with a second segment gear 35, and a rotatable pinion 36 meshing with the segment gear 35 and operated through a latch lever 37. Latch lever 37 is secured to the shaft 35$^a$ of gear 35. A transversely extending shaft 38, for a purpose presently to appear, has the ends thereof extending through and mounted in bearings 39 carried by the side frame members.

As a means for holding the shoe against too rapidly shifting operation, I mount beneath the running boards 13$^a$ dashpots 40, movements of the pistons 41 of which are resisted by springs 42 and by suitably cushioning fluid disposed within the cylinder, such as oil, which must pass through restricted ports 43 formed in the piston. The rods of these pistons, which are indicated at 44, are connected to the upper ends of shoes 24 by means of flexible elements 45 and where, as in the modified construction illustrated in Figure 5, the vehicle has no rear fenders, this connection may be in the form of direct attachment. Where, however, the vehicle has fenders and the shoe moves to a position where it is behind these fenders, slack is produced in the cable by the movement of the shoe due to the extra length of the cable necessitated by flexing thereof about the rear end of the running board. The rearward movement of the pistons 41 is limited by blocks or stops 41$^a$ extending with the dashpots 40 from the rear heads 41$^b$ thereof. The pistons 41 are brought to a stop immediately on the shoes 24, arriving at their full range position below the wheels.

Some means must, accordingly, be provided for removing this slack, so that when the shoe first comes into engagement with the ground and the wheel, the flexible element will be taut.

In the present instance I have shown the piston rods as equipped at their ends with pulleys 46 over which the flexible elements are trained. From these pulleys the flexible elements pass about idler pulleys 47 carried by the running board, and are then secured to the free ends of arm 48, which are secured to shaft 38.

It will be obvious that when shaft 38 is rotated to operate the shaft 15 arms 48 will be simultaneously shifted and by this shifting will remove from the flexible element the slack occasioned by training thereof about the rear end of the running board, so that when the shoe comes into engagement with the ground, the flexible element is taut and further movement of the shoe must be accompanied by a movement of the associated piston.

In the operation of this device, when the vehicle begins to skid, the lever 37 may be pulled forwardly thereby rotating the gear 35 and pulling the link 34 forwardly. The pulling movement of the link 34 will coactively rock the gear 32 which, in turn, will rotate the gear 31 and cause the arm 17 to swing downwardly, the movement of the arm 17 downwardly carrying also the shoe member 24. Coactively with the forward movement of the link 34, the arm 48 will swing forwardly and maintain the flexible member 45 in taut condition, the spring 42 in the dashpot also operated to maintain the spring in taut condition. When the lower end of the shoe 24 engages the ground initially, the movement of the vehicle will force the shoe to swing beneath the tire, the swinging movement of the shoe being retarded by the spring 42 in the dashpot 40.

When the vehicle is stopped the shoes may be returned to their normal positions, by backing the wheels therefrom, so that the springs 42 in the dashpots may lift them to their initial engaging position and then operating the lever 37 to restore them to their inoperative position.

Since the construction herein illustrated is capable of a very considerable range of change and modification without in any manner departing from the spirit of the invention, and I accordingly do not limit myself to such specific structure except as hereinafter claimed.

I claim:—

1. In combination with the wheel of a vehicle, a shoe associated therewith and adapted for movement from an inoperative position where it is out of engagement with the wheel and ground to an operative position where it is disposed between the wheel and ground, means for shifting said shoe to cause a partial engagement of the shoe between the wheel and ground providing a yielding mounting for the shoe permitting its further movement to completely engaged position, and means yieldably resisting such further movement.

2. In combination with the wheel of a vehicle, a shoe associated therewith and adapted for movement from an inoperative position where it is out of engagement with the wheel and ground to an operative position where it is disposed between the wheel and ground, means for shifting said shoe to cause a partial engagement of the shoe between the wheel and ground providing a yielding mounting for the shoe permitting its further movement to completely engaged position, means yieldably resisting such further movement, a dashpot, a flexible element connecting the dashpot and shoe, said flexible element being under tension when the shoe arrives at such partial engaged position whereby further movement thereof is accompanied by a further movement of the piston of the dashpot.

3. A device as claimed in claim 2 wherein movement of the shoe from its inoperative to partially engaged position slackens the flexible element, and means are provided whereby said slack is removed through the operating mechanism.

4. In combination with a vehicle having the usual chassis frame and supporting wheels therefor, a transversely extending shaft rotatably supported by the frame, arms carried by said shaft, shoes carried by the arms and adapted to in one position of the shaft to be partially interposed with said wheels and the ground, the arms being formed in two pivotally connected sections capable of relative longitudinal movement whereby the shoes may shift to completely engage between the wheels and ground, and means yieldably resisting the complete engagement of the shoe between the wheels and ground.

5. In combination with a vehicle having the usual chassis frame and supporting wheels therefor, a transversely extending shaft rotatably supported by the frame, arms carried by said shaft, shoes carried by the arms and adapted to in one position of the shaft to be partially interposed with said wheels and the ground, the arms being formed in two pivotally connected sections capable of relative longitudinal movement whereby the shoes may shift to completely engage between the wheels and ground, means yieldably resisting the complete engagement of the shoe between the wheels and ground, comprising a dashpot associated with each shoe, and a flexible element connected to the piston of each dashpot and to the associated shoe, said flexible elements being tensioned when the shoes arrive at their partially engaged position.

6. In combination with a vehicle having the usual chassis frame and supporting wheels therefor, a transversely extending shaft rotatably supported by the frame, arms carried by said shaft, shoes carried by the arms and adapted to in one position of the shaft to be partially interposed with said wheels and the ground, the arms being formed in two pivotally connected sections capable of relative longitudinal movement whereby the shoes may shift to completely engage between the wheels and ground, means yieldably resisting the complete engagement of the shoe between the wheels and ground, comprising a dashpot associated with each shoe, a flexible element connected to the piston of each dashpot and to the associated shoe, and means for removing slack from the flexible element during movement of the shoes from an inoperative position where they are out of engagement with the wheels and ground to the partially engaged position.

In testimony whereof I hereunto affix my signature.

STEPHEN H. BANDLA.